United States Patent
Morita

(10) Patent No.: US 9,456,463 B2
(45) Date of Patent: Sep. 27, 2016

(54) MOBILE COMMUNICATION SYSTEM, USER TERMINAL, AND COMMUNICATION CONTROL METHOD

(71) Applicant: KYOCERA CORPORATION, Kyoto (JP)

(72) Inventor: Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/424,003

(22) PCT Filed: Aug. 6, 2013

(86) PCT No.: PCT/JP2013/071246
§ 371 (c)(1),
(2) Date: Feb. 25, 2015

(87) PCT Pub. No.: WO2014/034389
PCT Pub. Date: Mar. 6, 2014

(65) Prior Publication Data
US 2015/0264595 A1    Sep. 17, 2015

Related U.S. Application Data

(60) Provisional application No. 61/694,606, filed on Aug. 29, 2012.

(51) Int. Cl.
*H04W 76/02* (2009.01)
*H04W 40/24* (2009.01)
*H04W 52/02* (2009.01)
*H04W 8/00* (2009.01)
(Continued)

(52) U.S. Cl.
CPC .......... *H04W 76/023* (2013.01); *H04W 4/005* (2013.01); *H04W 8/005* (2013.01); *H04W 24/10* (2013.01); *H04W 40/246* (2013.01); *H04W 52/0245* (2013.01); *H04W 76/02* (2013.01)

(58) Field of Classification Search
None
See application file for complete search history.

(56) References Cited

U.S. PATENT DOCUMENTS

| 2010/0165882 A1 | 7/2010 | Palanki et al. |
| 2013/0273923 A1* | 10/2013 | Li ................... H04W 28/02 455/450 |
| 2013/0322388 A1 | 12/2013 | Ahn et al. |

(Continued)

FOREIGN PATENT DOCUMENTS

WO    2012/091418 A2    7/2012

OTHER PUBLICATIONS

International Search Report; PCT/JP2013/071246; Sep. 17, 2013.
(Continued)

*Primary Examiner* — Ashley Shivers
(74) *Attorney, Agent, or Firm* — Studebaker & Brackett PC

(57) ABSTRACT

A mobile communication system that supports D2D communication comprises: a user terminal that measures a received power value of a discovery-use signal for a discovery process of a communication partner in the D2D communication when the discovery-use signal is received from another user terminal; a base station that measures a received power value of a predetermined signal when the predetermined signal is received from the user terminal or the other user terminal; and a determination unit that determines whether to permit the D2D communication performed by the user terminal and the other user terminal on the basis of the received power value of the discovery-use signal and the received power value of the predetermined signal.

5 Claims, 15 Drawing Sheets

(51) Int. Cl.
*H04W 4/00* (2009.01)
*H04W 24/10* (2009.01)

(56) References Cited

U.S. PATENT DOCUMENTS

2014/0004796 A1* 1/2014 Cakulev .............. H04W 76/023
455/41.2
2014/0022986 A1* 1/2014 Wu ....................... H04W 48/16
370/328

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

The extended European search report issued by the European Patent Office on Feb. 12, 2016, which corresponds to European Patent Application No. 13833968.4-1854 and is related to U.S. Appl. No. 14/424,003.

\* cited by examiner

MOBILE COMMUNICATION SYSTEM, USER TERMINAL, AND COMMUNICATION CONTROL METHOD

TECHNICAL FIELD

The present invention relates to a mobile communication system that supports D2D communication, a user terminal thereof, and a communication control method thereof.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of user terminals adjacent to one another perform direct radio communication in a frequency band assigned to a mobile communication system. It is noted that the D2D communication is also called Proximity Service communication.

PRIOR ART DOCUMENT

Non-Patent Document

Non-Patent Document 1: 3GPP technical report "TR 22.803 V0.3.0" May 2012

SUMMARY OF THE INVENTION

The current specifications have a problem in that there is no mechanism for appropriately controlling the D2D communication.

Therefore, the present invention provides a mobile communication system capable of appropriately controlling D2D communication, a user terminal thereof, and a communication control method thereof.

According to an embodiment, a mobile communication system that supports D2D communication that is direct device-to-device communication, comprises: a user terminal that measures a received power value of a discovery-use signal for a discovery process of a communication partner in the D2D communication when the discovery-use signal is received from another user terminal; a base station that measures a received power value of a predetermined signal when the predetermined signal is received from the user terminal or the other user terminal; and a determination unit that determines whether to permit the D2D communication performed by the user terminal and the other user terminal on the basis of the received power value of the discovery-use signal and the received power value of the predetermined signal.

According to an embodiment, a user terminal that supports D2D communication that is a direct device-to-device communication, comprises: a control unit that measures a received power value of a discovery-use signal for a discovery process of a communication partner in the D2D communication when the discovery-use signal is received from another user terminal, and controls the received power value to be transmitted to a base station.

According to an embodiment, a communication control method in a mobile communication system, which supports D2D communication that is a direct device-to-device communication, comprises: a step A of measuring, by a user terminal, a received power value of a discovery-use signal for a discovery process of a communication partner in the D2D communication when the discovery-use signal is received from another user terminal; a step B of measuring, by a base station, a received power value of a predetermined signal when the predetermined signal is received from the user terminal or the other user terminal; and a step C of determining whether to permit the D2D communication performed by the user terminal and the other user terminal on the basis of the received power value of the discovery-use signal and the received power value of the predetermined signal.

DESCRIPTION OF THE EMBODIMENT

Overview of Embodiment

A mobile communication system according to an embodiment supports D2D communication that is direct device-to-device communication. The mobile communication system comprises: a user terminal that measures a received power value of a discovery-use signal for a discovery process of a communication partner in the D2D communication when the discovery-use signal is received from another user terminal; a base station that measures a received power value of a predetermined signal when the predetermined signal is received from the user terminal or the other user terminal; and a determination unit that determines whether to permit the D2D communication performed by the user terminal and the other user terminal on the basis of the received power value of the discovery-use signal and the received power value of the predetermined signal.

Thereby, it is possible to estimate a distance between terminals from a received power value A of the discovery-use signal and to estimate a distance between a terminal and a base station from a received power value B of a predetermined signal, so that the determination unit is able to appropriately determine whether to permit the D2D communication. For example, when the received power value B (≈ the distance between the terminal and the base station) is smaller than the received power value A (≈ the distance between terminals), the determination unit does not permit the D2D communication, as a result of which it is possible to prevent the D2D communication from giving significant interference to the base station. Therefore, it is possible to appropriately control the D2D communication.

The user terminal may transmit the predetermined signal including the received power value of the discovery-use signal to the base station. Thereby, it is possible to notify the base station of the received power value A of the discovery-use signal, so that whether to permit the D2D communication can be determined at a network side. Furthermore, a signal for notifying the received power value A can be made common to a signal for measuring the received power value B, so that it is possible to reduce signaling.

Alternatively, the base station may receive the discovery-use signal as the predetermined signal. Thereby, a signal for a discovery process of a communication partner can be made common to the signal for measuring the received power value B, so that it is possible to reduce signaling.

A transmission power value of the discovery-use signal and/or a transmission power value of the predetermined signal may be designated by the base station. Thereby, it is possible to appropriately perform the estimation of the distance between terminals and the estimation of the distance between the terminal and the base station.

Embodiment

A description will be provided for an embodiment in which D2D communication is introduced to a mobile communication system (hereinafter, an "LIE system") configured in conformity to the 3GPP standards, below.

(LTE System)

Figure 1:
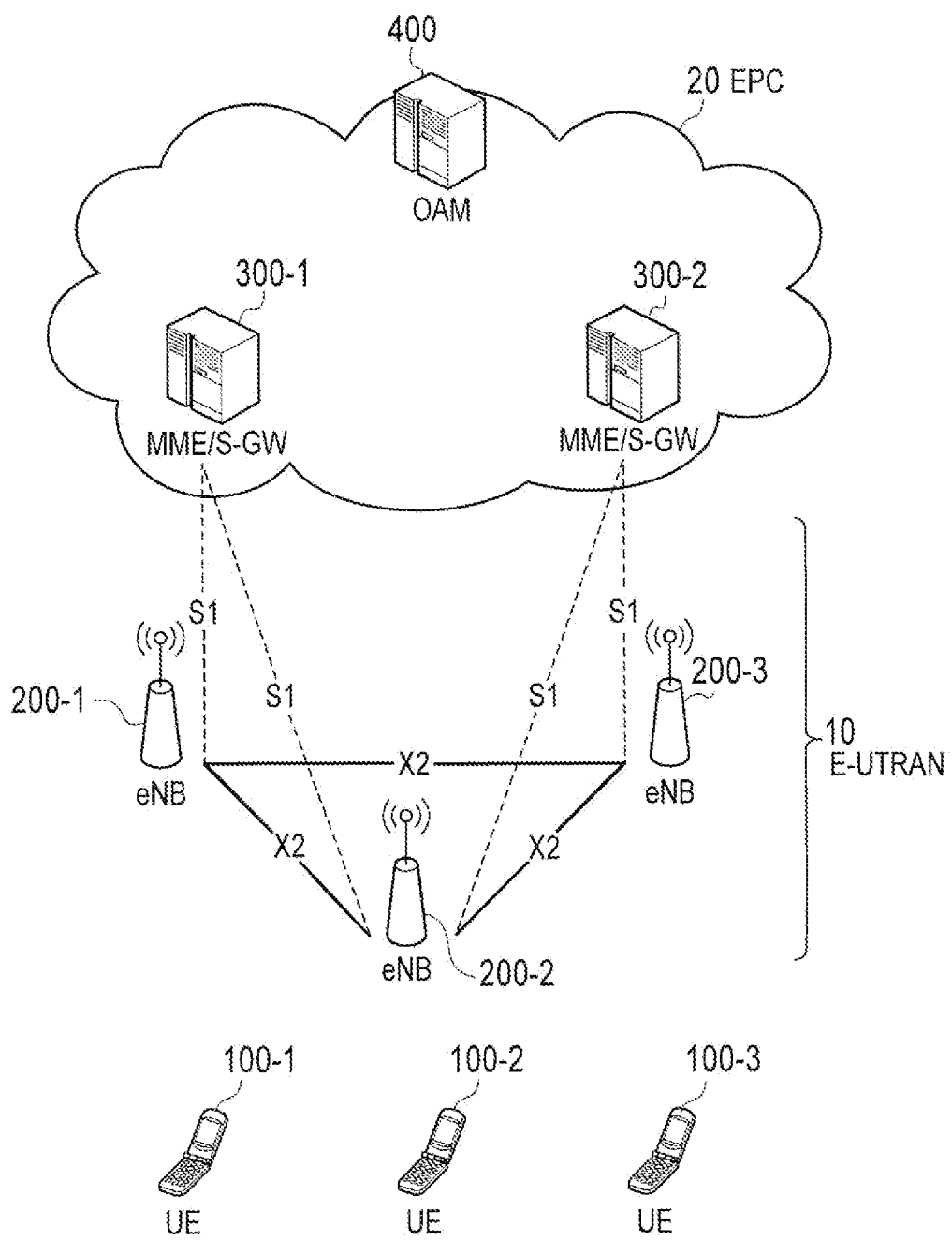
FIG. 1 is a configuration diagram of an LTE system.

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMES (Mobility management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
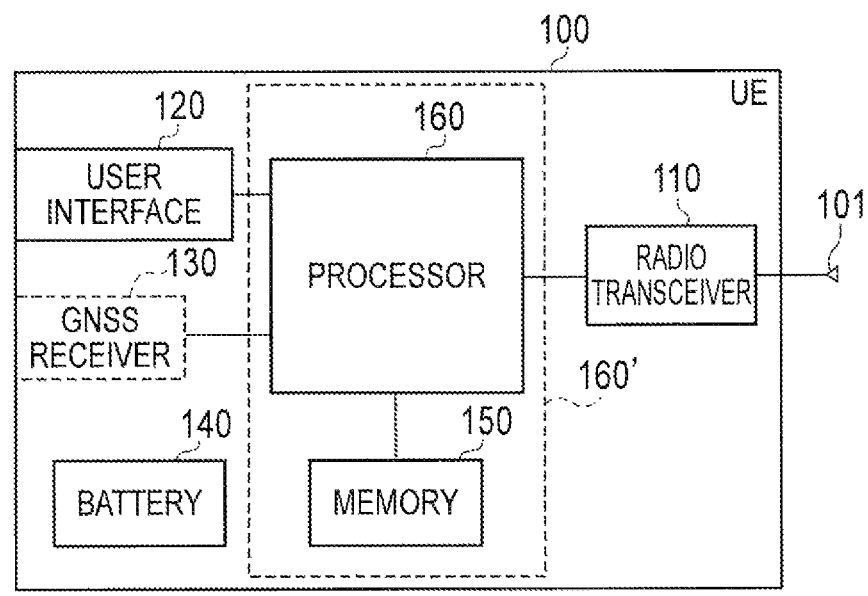
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, coding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
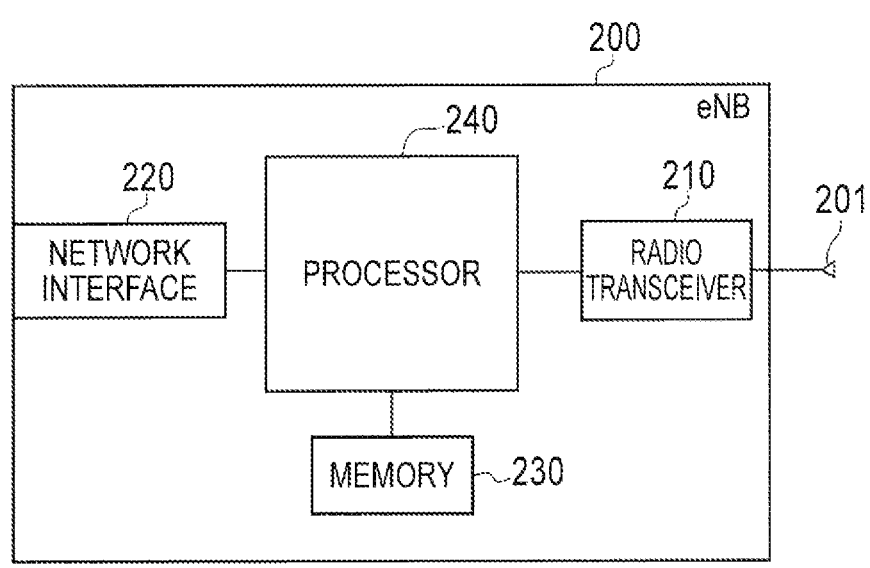
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that per form various processes by executing the program stored in the memory 230. The processor 240 implements various processes and various communication protocols described later. Furthermore, the memory 230 may be integrally formed with the processor 240, and this set (that is, a chipset) may be called a processor.

Figure 4:
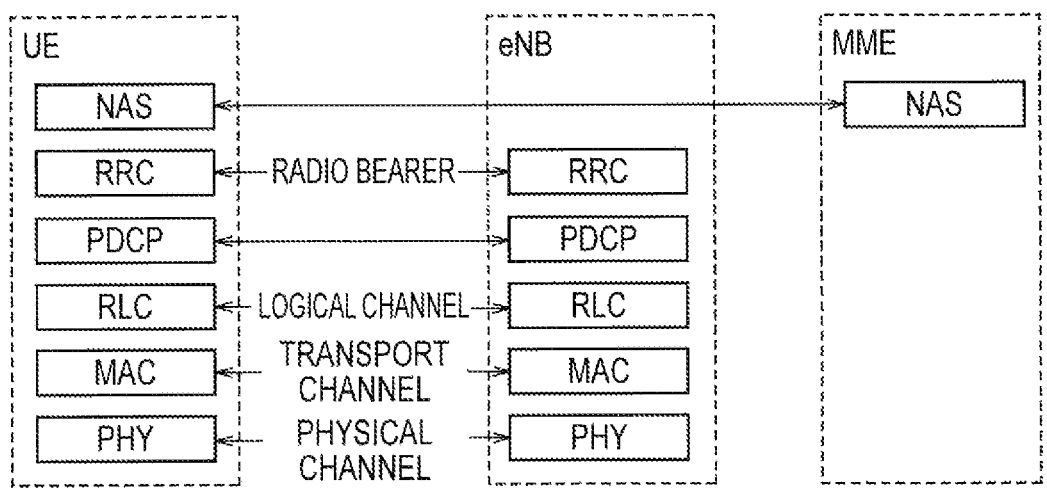
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
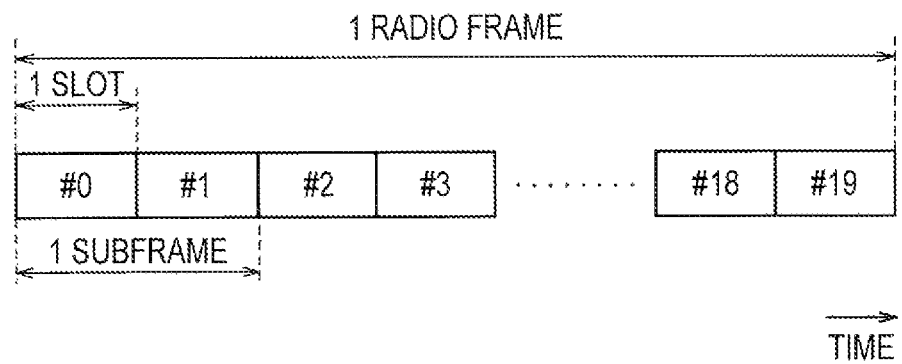
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSS) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged. Specifically, the DMRS is arranged at the fourth symbol of each slot in the case of normal CP and is arranged at the third symbol of each slot in the case of expanded CP. The SRS is arranged at the final symbol of a subframe.

(D2D Communication)

Next, description is given by comparing the D2D communication with the normal communication (the cellular communication) in the LTE system.

Figure 6:
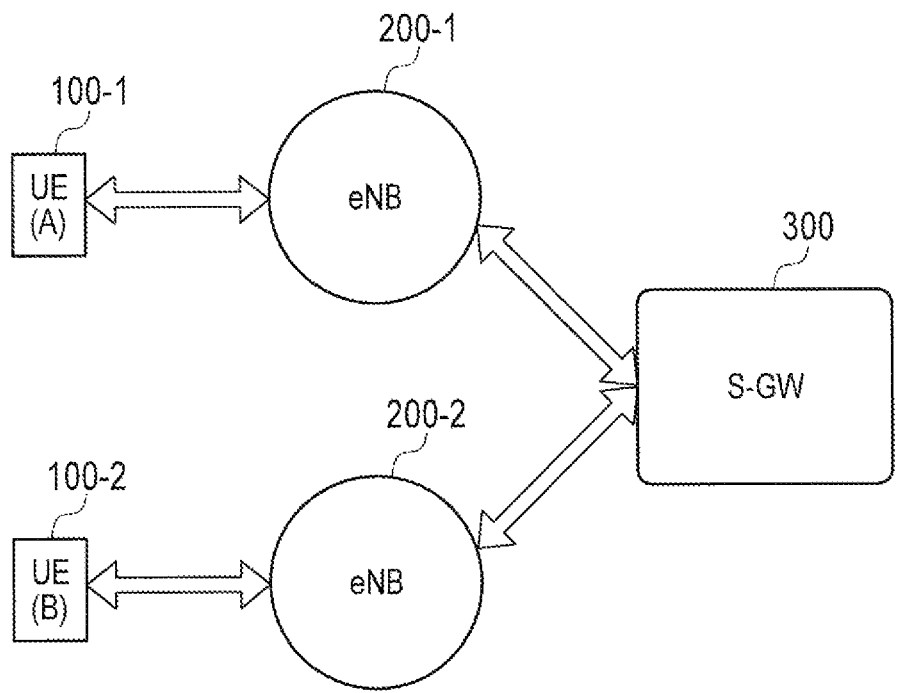
FIG. 6 is a diagram for explaining a data path in cellular communication.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
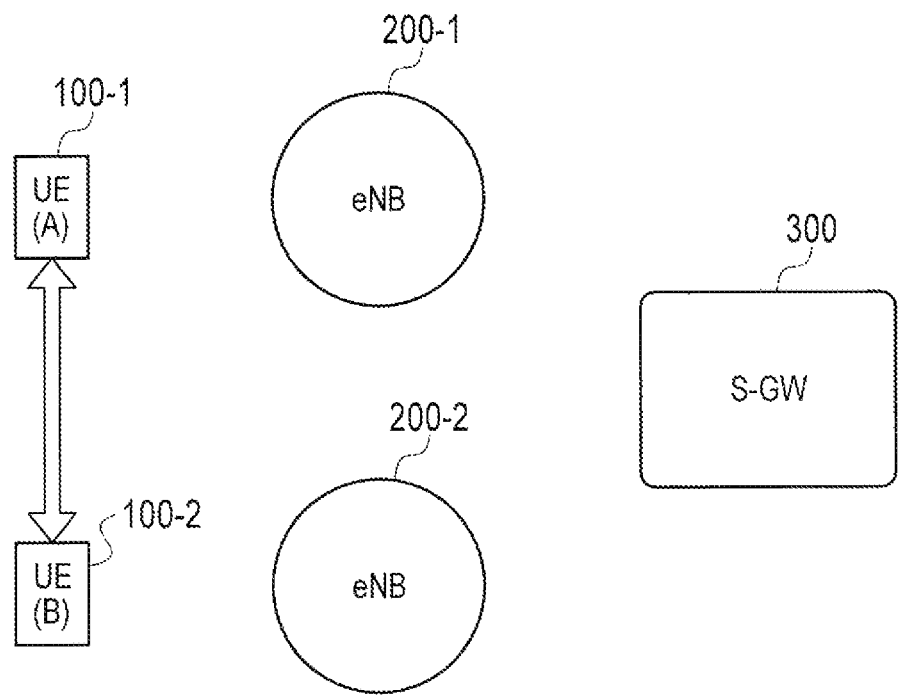
FIG. 7 is a diagram for explaining a data path in D2D communication.

FIG. 7 illustrates a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2. In this case, the UE 100-1 and the UE 100-2 constitute a D2D group.

After the UE 100 discovers UE existing in the vicinity of the UE 100, the D2D communication is started. It is noted that in order to start the D2D communication, the UE 100 has a (Discover) function of discovering the other UE 100 existing in the vicinity of the UE 100. Furthermore, the UE 100 has a (Discoverable) function discovered by the other UE 100. For example, the UE 100-1 searching for the UE 100-2 periodically transmits a Discover signal (or a Discoverable signal). The UE 100-2 periodically attempts to receive the Discover signal. When the Discover signal is received from the UE 100-1, the UE 100-2 discovers the UE 100-1 and transmits a Discover response, which is a Discover response for the Discover signal, to the UE 100-1. However, the transmission of the Discover response is not essential, and may be omitted. When the Discover response is received from the UE 100-2, the UE 100-1 discovers the UE 100-2. In the present embodiment, the Discover signal (or the Discoverable signal) and the Discover response correspond to the discovery-use signal for a discovery process.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. It is noted that in a special mode called Locally Routed, a data path passes through the eNB 200 without passing through the S-GW 300.

Furthermore, the D2D communication is considered to be performed in a frequency band of the LTE system, and for example, in order to avoid interference to the cellular communication, the D2D communication is performed under the control of the network (eNB 200). A radio resource assignment scheme for the D2D communication mainly includes the following two schemes.

According to the first assignment scheme, the UE 100 is able to select a radio resource to be used in the D2D communication. Specifically, the network (eNB 200) transmits, to the UE 100, information indicating candidate assigned radio resources that are radio resources available for the D2D communication. The UE 100 autonomously selects a radio resource to be used in the D2D communication from the candidate assigned radio resources.

According to the second assignment scheme, the network (eNB 200) determines a radio resource to be used in the D2D communication. That is, the UE 100 has no selection right of the radio resource to be used in the D2D communication. Specifically, the eNB 200 transmits, to the UE 100, information indicating a radio resource dynamically or quasi-statically assigned for the D2D communication. The UE 100 performs the D2D communication by using the assigned radio resource.

Operation According to Embodiment

Next, an operation according to the present embodiment will be described.

(1) Basic Operation

Figure 8:
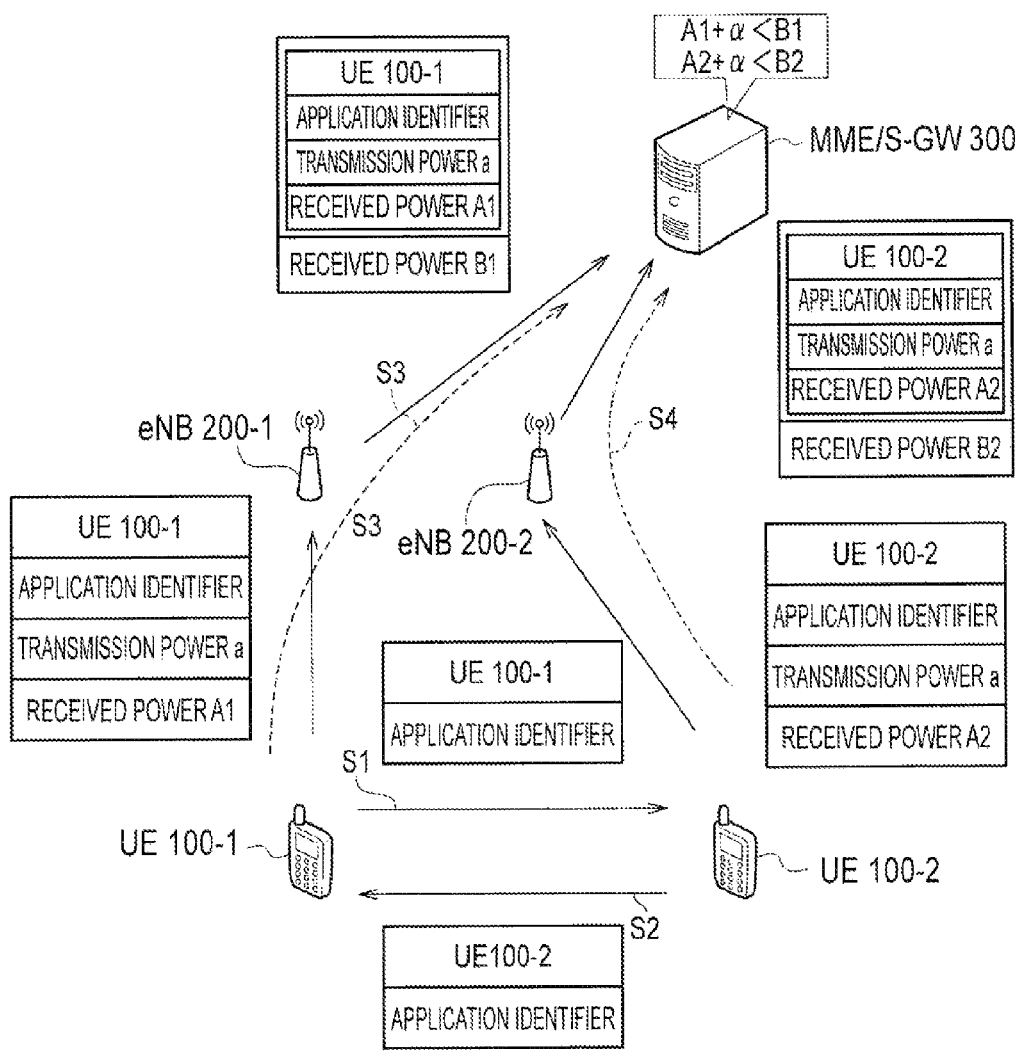
FIG. 8 is a diagram for explaining a basic operation of an embodiment.

FIG. 8 is a diagram for explaining a basic operation of the present embodiment. Hereinafter, the following description will be provided for the case in which the UE 100-1 and the UE 100-2 camp on different cells of the eNB 200.

As illustrated in FIG. 8, in step S1, the UE 100-1 transmits the Discover signal by using a transmission power value a. The Discover signal includes an identifier of the UE 100-1 and an identifier of an application that is used in the D2D communication. As the UE identifier, for example, GUTI (Globally Unique Temporary Identifier) is available. The application identifier, for example, is used for limiting UE (UE that will transmit a Discover response) that will respond to the Discover signal.

The UE 100-2 stands by for the Discover signal and receives the Discover signal from the UE 100-1. The UE 100-2 measures a received power value A1 (received signal strength) of the Discover signal and stores the measured received power value A1.

In step S2, in response to the reception of the Discover signal, the UE 100-2 transmits the Discover response to the UE 100-1 by using the transmission power value a. The Discover response includes an identifier of the UE 100-2 and the identifier of the application that is used in the D2D communication.

The UE 100-1 stands by for the Discover response and receives the Discover response from the UE 100-2. The UE 100-1 measures a received power value A1 (received signal strength) of the Discover response and stores the measured received power value A1.

In step S3, in response to the reception of the Discover response, the UE 100-1 transmits a signal 1 (here, Discover response information) for starting the D2D communication to the eNB 200-1. The signal 1 includes the identifier of the UE 100-1, the identifier of the application that is used in the D2D communication, the transmission power value a of the Discover signal, and the received power value A1 of the Discover response. The signal 1 may further include the identifier of the UE 100-2.

When the signal 1 is received, the eNB 200-1 measures a received power value B1 of the signal 1, adds the measured received power value B1 to the signal 1, and transfers the signal 1 to the MME/S-GW 300.

In step S4, in response to the transmission of the Discover response, the UE 100-2 transmits a signal 2 (here, Discover reception information) for starting the D2D communication to the eNB 200-2. The signal 2 includes the identifier of the UE 100-2, the identifier of the application that is used in the D2D communication, the transmission power value a of the Discover response, and the received power value A2 of the Discover signal. The signal 2 may further include the identifier of the UE 100-1.

When the signal 2 is received, the eNB 200-2 measures a received power value B2 of the signal 2, adds the measured received power value B2 to the signal 2, and transfers the signal 2 to the MME/S-GW 300.

When the signal 1 and the signal 2 are received, the MME/S-GW 300 determines whether the D2D communication by the UE 100-1 and the UE 100-2 is possible on the basis of the signal 1 and the signal 2.

Specifically, the MME/S-GW 300 determines whether the D2D communication by the UE 100-1 and the UE 100-2 is possible on the basis of the received power values (A1 and A2) of the discovery-use signal (the Discover signal and the Discover response) and the received power values (B1 and B2) of the signals received in the eNB 200 from the UE 100-1 and the UE 100-2.

In the present embodiment, the MME/S-GW 300 corresponds to the determination unit that determines whether to permit the D2D communication.

Hereinafter, when it is assumed that the transmission power value a of the discovery-use signal is equal to the transmission power values (uplink transmission power) of the signal 1 and the signal 2, the MME/S-GW 300 permits the D2D communication by the UE 100-1 and the UE 100-2 if the following conditions are satisfied.

$$A1+\alpha<B1$$

$$A2+\alpha<B2$$

Meanwhile, when the above conditions are not satisfied, the MME/S-GW 300 rejects the D2D communication by the UE 100-1 and the UE 100-2.

As described above, when the received power value B ($\approx$ the distance between the UE and the eNB) is smaller than the received power value A ($\approx$ the distance between the UEs), the MME/S-GW 300 does not permit the D2D communication, as a result of which it is possible to prevent the D2D communication by the UE 100-1 and the UE 100-2 from giving significant interference to the eNB 200.

It is noted that in order to absorb a variation in a propagation environment, it is preferable to perform determination by using an average value of results of measurements performed a plurality of times. At this time, it is assumed that a standard deviation $3(\sigma_A+\sigma_B)$ of each of the received power value A and the received power value B is set as "$\alpha$".

Alternatively, "$\alpha$" may be set on the basis of the application that is used in the D2D communication. For example, when the application is an application of burst traffic (for example, video streaming distribution, real-time video communication, or mass data transfer), "$\alpha$" is set to be a large value. On the other hand, when the application is not the application of burst traffic (for example, chat or a text email), "$\alpha$" is set to be a small value.

Furthermore, the above condition is applicable to the case in which the transmission power value a of the discovery-use signal is equal to the transmission power values (uplink transmission power) of the signal 1 and the signal 2. However, when the transmission power value a of the discovery-use signal is different from the transmission power values of the signal 1 and the signal 2, the following condition is applicable instead of the above condition.

$$A1+\alpha<B1-b+a$$

$$A2+\alpha<B2-b+a$$

In the above condition, "b" denotes the transmission power values of the signal 1 and the signal 2. When the condition is not satisfied, the MME/S-GW 300 rejects the D2D communication by the UE 100-1 and the UE 100-2.

When it is determined that the D2D communication by the UE 100-1 and the UE 100-2 is possible, the MME/S-GW 300 notifies each eNB 200 and each UE 100 of the fact that the D2D communication by the UE 100-1 and the UE 100-2 is possible and necessary information. As a consequence, under the control of the network (the MME/S-GW 300 and the eNB 200), the D2D communication is started.

So far, the basic operation has been described. Hereinafter, detailed examples of the operation according to the present embodiment will be described.

(2) Operation Example 1

Figure 9:
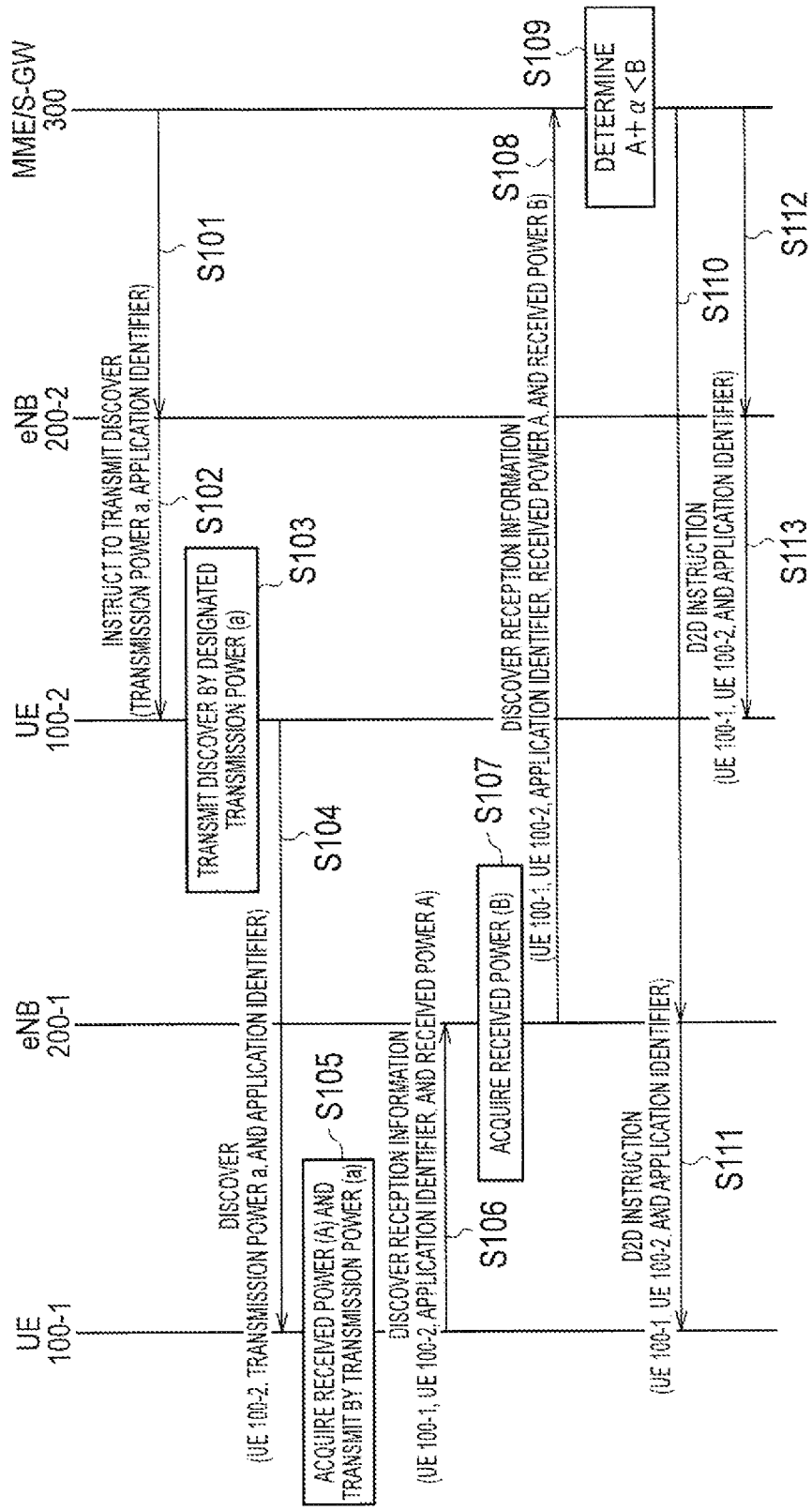
FIG. 9 is a sequence diagram of an operation example 1 according to the embodiment.

FIG. 9 is a sequence diagram of an operation example 1 according to the present embodiment. The following description will be provided for the case in which the UE 100-2 is a transmission side of the Discover signal and the UE 100-1 is a reception side of the Discover signal.

As illustrated in FIG. 9, in steps S101 and S102, the MME/S-GW 300 transmits a Discover signal transmission instruction for instructing to transmit the Discover signal to the UE 100-2 via the eNB 200-2. The Discover signal transmission instruction includes the transmission power value a of the Discover signal and the identifier of the application that is used in the D2D communication. The UE 100-2 receives the Discover signal transmission instruction.

In steps S103 and S104, the UE 100-2 transmits the Discover signal by using the transmission power value a designated by the Discover signal transmission instruction. In the present operation example, the Discover signal includes the identifier of the UE 100-2, the transmission power value a of the Discover signal, and the identifier of the application that is used in the D2D communication. The UE 100-1 receives the Discover signal.

In steps S105 and S106, the UE 100-1 measures the received power value A of the Discover signal, and transmits the signal 1 (the Discover reception information in the present operation example) for starting the D2D communication to the eNB 200-1. Furthermore, the UE 100-1 transmits the Discover reception information by using the transmission power value a included in the Discover signal. The Discover reception information includes the identifier of the UE 100-1, the identifier of the UE 100-2, the identifier of the application that is used in the D2D communication, and the received power value A of the Discover signal. The eNB 200-1 receives the Discover reception information.

In steps S107 and S108, the eNB 200-1 measures the received power value B of the Discover reception information, adds the measured received power value B to the Discover reception information, and transfers the Discover reception information to the MME/S-GW 300. The MME/S-GW 300 receives the Discover reception information.

In step S109, on the basis of the Discover reception information, the MME/S-GW 300 determines whether the D2D communication by the UE 100-1 and the UE 100-2 is possible. In the present operation example, when the following condition is satisfied, the MME/S-GW 300 permits the D2D communication by the UE 100-1 and the UE 100-2.

$$A+\alpha<B$$

Meanwhile, when the above conditions are not satisfied, the MME/S-GW 300 rejects the D2D communication by the UE 100-1 and the UE 100-2. The following description will be given on the assumption that the above condition is satisfied.

In steps S110 and S111, the MME/S-GW 300 transmits a D2D instruction for instructing to start the D2D communication to the UE 100-1 via the eNB 200-1. The D2D instruction includes the identifier of the UE 100-1, the identifier of the UE 100-2, and the identifier of the application that is used in the D2D communication. The UE 100-1 receives the D2D instruction.

In steps S112 and S113, the MME/S-GW 300 transmits the D2D instruction for instructing to start the D2D communication to the UE 100-2 via the eNB 200-2. The D2D instruction includes the identifier of the UE 100-1, the identifier of the UE 100-2, and the identifier of the application that is used in the D2D communication. The UE 100-2 receives the D2D instruction.

(3) Operation Example 2

Figure 10:
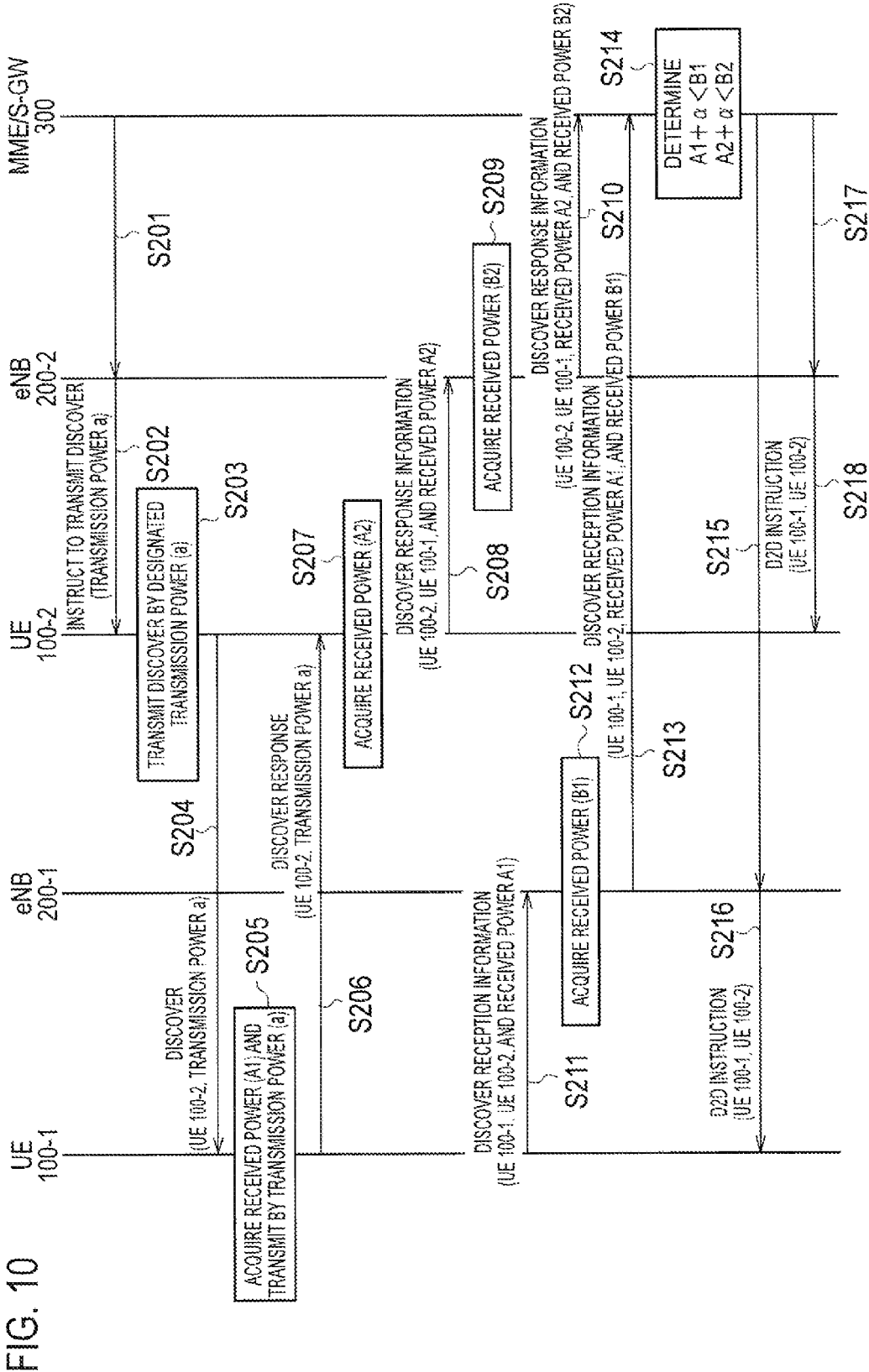
FIG. 10 is a sequence diagram of an operation example 2 according to the embodiment.

FIG. 10 is a sequence diagram of an operation example 2 according to the present embodiment. In this case, differences from the operation example 1 will be mainly described.

As illustrated in FIG. 10, in steps S201 and S202, the MME/S-GW 300 transmits the Discover signal transmission instruction for instructing to transmit the Discover signal to the UE 100-2 via the eNB 200-2. The Discover signal transmission instruction includes the transmission power value a of the Discover signal. The UE 100-2 receives the Discover signal transmission instruction.

In steps S203 and S204, the UE 100-2 transmits the Discover signal by using the transmission power value a designated by the Discover signal transmission instruction. In the present operation example, the Discover signal includes the identifier of the UE 100-2 and the transmission power value a of the Discover signal. The UE 100-1 receives the Discover signal.

In steps S205 and S206, the UE 100-1 measures the received power value A1 of the Discover signal, and transmits the Discover response to the UE 100-2. Furthermore, the UE 100-1 transmits the Discover response by using the transmission power value a included in the Discover signal. The Discover response includes the identifier of the UE 100-2 and the transmission power value a. The UE 100-2 receives the Discover response.

In steps S207 and S208, the UE 100-2 measures the received power value A2 of the Discover response, and transmits the signal 2 (here, the Discover response information) to the eNB 200-2. Furthermore, the UE 100-2 transmits the Discover response information by using the transmission power value a included in the Discover response from the UE 100-1. The Discover response information includes the identifier of the UE 100-2, the identifier of the UE 100-1, and the received power value A2 of the Discover response. The eNB 200-2 receives the Discover response information.

In steps S209 and S210, the eNB 200-2 measures the received power value B2 of the Discover response information, adds the measured received power value B2 to the Discover response information, and transfers the Discover response information to the MME/S-GW 300. The MME/S-GW 300 receives the Discover response information.

Meanwhile, in step S211, the UE 100-1 transmits the signal 1 (the Discover reception information in the present operation example) for starting the D2D communication to the eNB 200-1. Furthermore, the UE 100-1 transmits the Discover reception information by using the transmission power value a included in the Discover signal from the UE 100-2. The Discover reception information includes the identifier of the UE 100-1, the identifier of the UE 100-2, the identifier of the application used for the D2D communication, and the received power value A1 of the Discover signal. The eNB 200-1 receives the Discover reception information.

In steps S212 and S213, the eNB 200-1 measures the received power value B1 of the Discover reception information, adds the measured received power value B1 to the Discover reception information, and transfers the Discover reception information to the MME/S-GW 300. The MME/S-GW 300 receives the Discover reception information.

In step S214, on the basis of the Discover reception information and the Discover response information, the MME/S-GW 300 determines whether the D2D communication by the UE 100-1 and the UE 100-2 is possible. In the present operation example, when the following condition is satisfied, the MME/S-GW 300 permits the D2D communication by the UE 100-1 and the UE 100-2.

$$A1 + \alpha < B1$$

$$A2 + \alpha < B2$$

Meanwhile, when the above conditions are not satisfied, the MME/S-GW 300 rejects the D2D communication by the UE 100-1 and the UE 100-2. The following description will be given on the assumption that the above condition is satisfied.

In steps S215 and S216, the MME/S-GW 300 transmits the D2D instruction for instructing to start the D2D communication to the UE 100-1 via the eNB 200-1. The D2D instruction includes the identifier of the UE 100-1 and the identifier of the UE 100-2. The UE 100-1 receives the D2D instruction.

In steps S217 and S218, the MME/S-GW 300 transmits the D2D instruction for instructing to start the D2D communication to the UE 100-2 via the eNB 200-2. The D2D instruction includes the identifier of the UE 100-1 and the identifier of the UE 100-2. The UE 100-2 receives the D2D instruction.

(4) Operation Example 3

Figure 11:
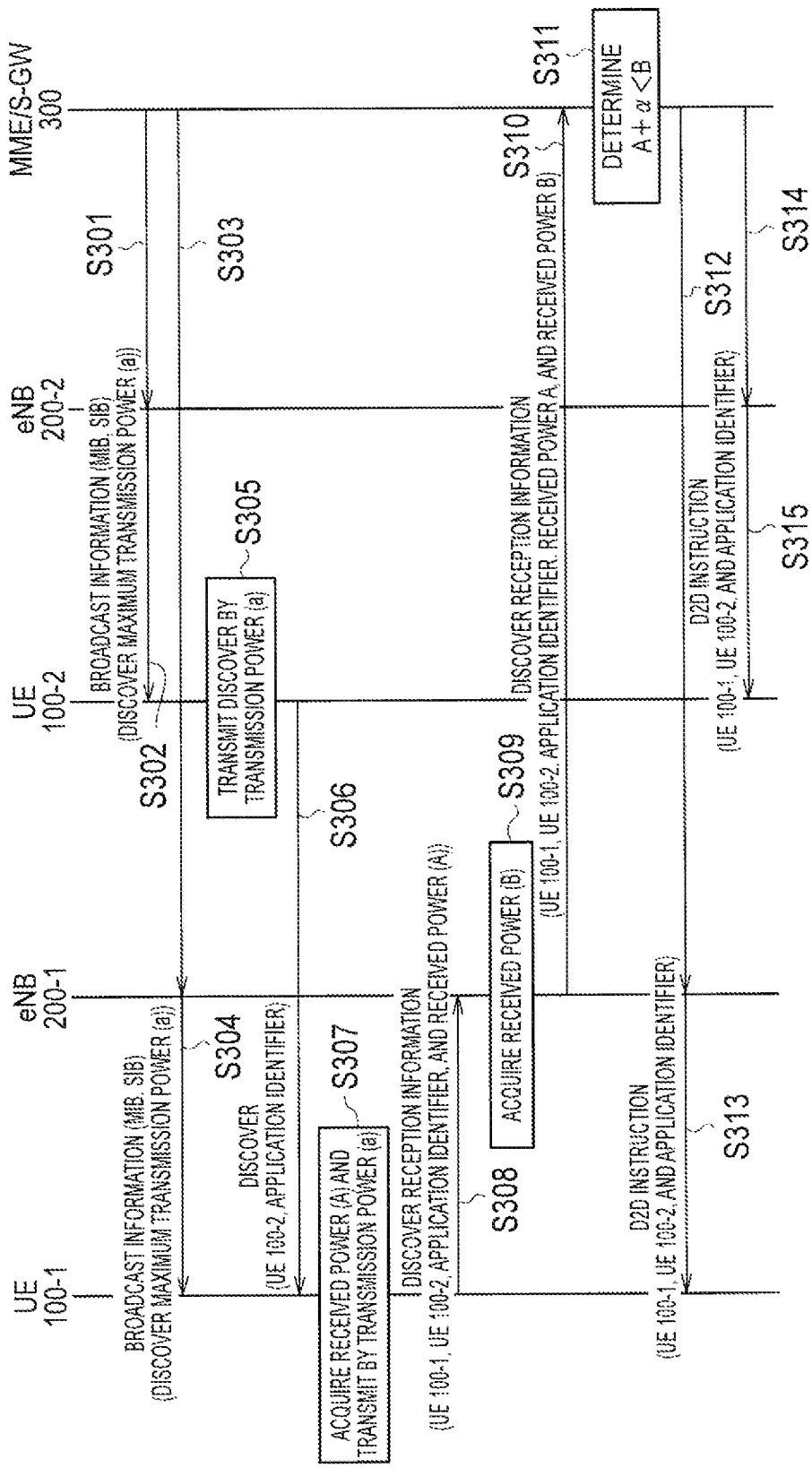
FIG. 11 is a sequence diagram of an operation example 3 according to the embodiment.

FIG. 11 is a sequence diagram of an operation example 3 according to the present embodiment. In this case, differences from the operation example 1 will be mainly described. The present operation example shares in common with the operation example 1 in that the transmission power value a is designated from the network, but is different from the operation example 1 in that the transmission power value a is transmitted (broadcasted) in a broadcast manner.

As illustrated in FIG. 11, in step S301, the MME/S-GW 300 notifies the eNB 200-2 of the transmission power value (a maximum transmission power value) a of the Discover signal.

In step S302, the eNB 200-2 transmits the transmission power value a in a broadcast manner. Specifically, the eNB 200-2 transmits broadcast information (MIB or SIB) with the transmission power value a included therein. The UE 100-2 receives the transmission power value a.

In step S303, the MME/S-GW 300 notifies the eNB 200-1 of the transmission power value (the maximum transmission power value) a of the Discover signal.

In step S304, the eNB 200-1 transmits the transmission power value a in a broadcast manner. Specifically, the eNB 200-1 transmits the broadcast information (MIB or SIB) with the transmission power value a included therein. The UE 100-1 receives the transmission power value a.

In steps S305 and S306, the UE 100-2 transmits the Discover signal by using the transmission power value a. In the present operation example, the Discover signal includes the identifier of the UE 100-2 and the identifier of the application that is used in the D2D communication. The UE 100-1 receives the Discover signal.

Subsequent operations (steps S307 to S315) are equal to those (steps S105 to S113) of the operation example 1.

(5) Operation Example 4

Figure 12:
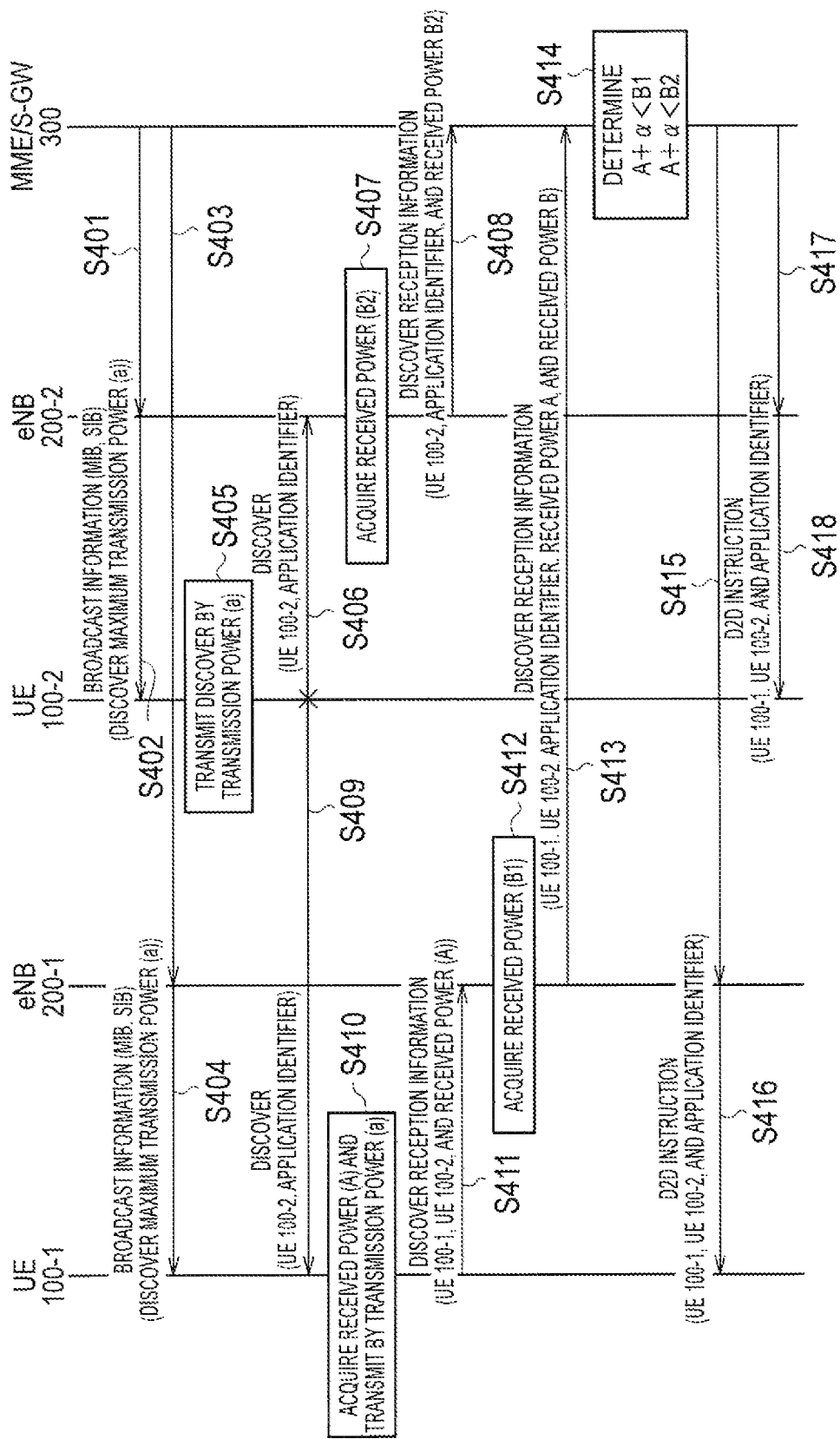
FIG. 12 is a sequence diagram of an operation example 4 according to the embodiment.

FIG. 12 is a sequence diagram of an operation example 4 according to the present embodiment. In this case, differences from the operation example 1 will be mainly described. The present operation example shares in common with the operation example 1 in that the transmission power value a is designated from the network, but is different from the operation example 1 in that the transmission power value a is transmitted (broadcasted) in a broadcast manner. Furthermore, the operation example 4 is different from the operation example 1 in that the eNB 200-2 measures the received power value of the Discover signal from the UE 100-2.

As illustrated in FIG. 12, in step S401, the MME/S-GW 300 notifies the eNB 200-2 of the transmission power value (the maximum transmission power value) a of the Discover signal.

In step S402, the eNB 200-2 transmits the transmission power value a in a broadcast manner. Specifically, the eNB 200-2 transmits broadcast information (MIB or SIB) with the transmission power value a included therein. The UE 100-2 receives the transmission power value a.

In step S403, the MME/S-GW 300 notifies the eNB 200-1 of the transmission power value (the maximum transmission power value) a of the Discover signal.

In step S404, the eNB 200-1 transmits the transmission power value a in a broadcast manner. Specifically, the eNB 200-1 transmits the broadcast information (MIB or SIB) with the transmission power value a included therein. The UE 100-1 receives the transmission power value a.

In steps S405 and S406, the UE 100-2 transmits the Discover signal by using the transmission power value a. In the present operation example, the Discover signal includes the identifier of the UE 100-2 and the identifier of the application that is used in the D2D communication. The eNB 200-2 and the UE 100-1 receive the Discover signal (steps S406 and S409).

In steps S407 and S408, the eNB 200-2 measures the received power value B2 of the Discover signal and transmits the Discover reception information to the MME/S-GW 300. The Discover reception information includes the identifier of the UE 100-2, the identifier of the application that is used in the D2D communication, and the received power value B2 of the Discover signal. The MME/S-GW 300 receives the Discover reception information.

Meanwhile, in steps S410 and S411, the UE 100-1 measures the received power value A of the Discover signal, and transmits the signal 1 (the Discover reception information in the present operation example) for starting the D2D communication to the eNB 200-1. Furthermore, the UE 100-1 transmits the Discover reception information by using the transmission power value a. The Discover reception information includes the identifier of the UE 100-1, the identifier of the UE 100-2, the identifier of the application that is used in the D2D communication, and the received power value A of the Discover signal. The eNB 200-1 receives the Discover reception information.

In steps S412 and S413, the eNB 200-1 measures the received power value B1 of the Discover reception information, adds the measured received power value B1 to the Discover reception information, and transfers the Discover reception information to the MME/S-GW 300. The MME/S-GW 300 receives the Discover reception information.

In step S414, on the basis of the Discover reception information, the MME/S-GW 300 determines whether the D2D communication by the UE 100-1 and the UE 100-2 is possible. In the present operation example, when the following condition is satisfied, the MME/S-GW 300 permits the D2D communication by the UE 100-1 and the UE 100-2.

$$A+\alpha<B1$$

$$A+\alpha<B2$$

Meanwhile, when the above conditions are not satisfied, the MME/S-GW 300 rejects the D2D communication by the UE 100-1 and the UE 100-2. The following description will be given on the assumption that the above condition is satisfied.

In steps S415 and S416, the MME/S-GW 300 transmits the D2D instruction for instructing to start the D2D communication to the UE 100-1 via the eNB 200-1. The D2D instruction includes the identifier of the UE 100-1, the identifier of the UE 100-2, and the identifier of the application that is used in the D2D communication. The UE 100-1 receives the D2D instruction.

In steps S417 and S418, the MME/S-GW 300 transmits the D2D instruction for instructing to start the D2D communication to the UE 100-2 via the eNB 200-2. The D2D instruction includes the identifier of the UE 100-1, the identifier of the UE 100-2, and the identifier of the application that is used in the D2D communication. The UE 100-2 receives the D2D instruction.

(6) Operation Example 5

Figure 13:
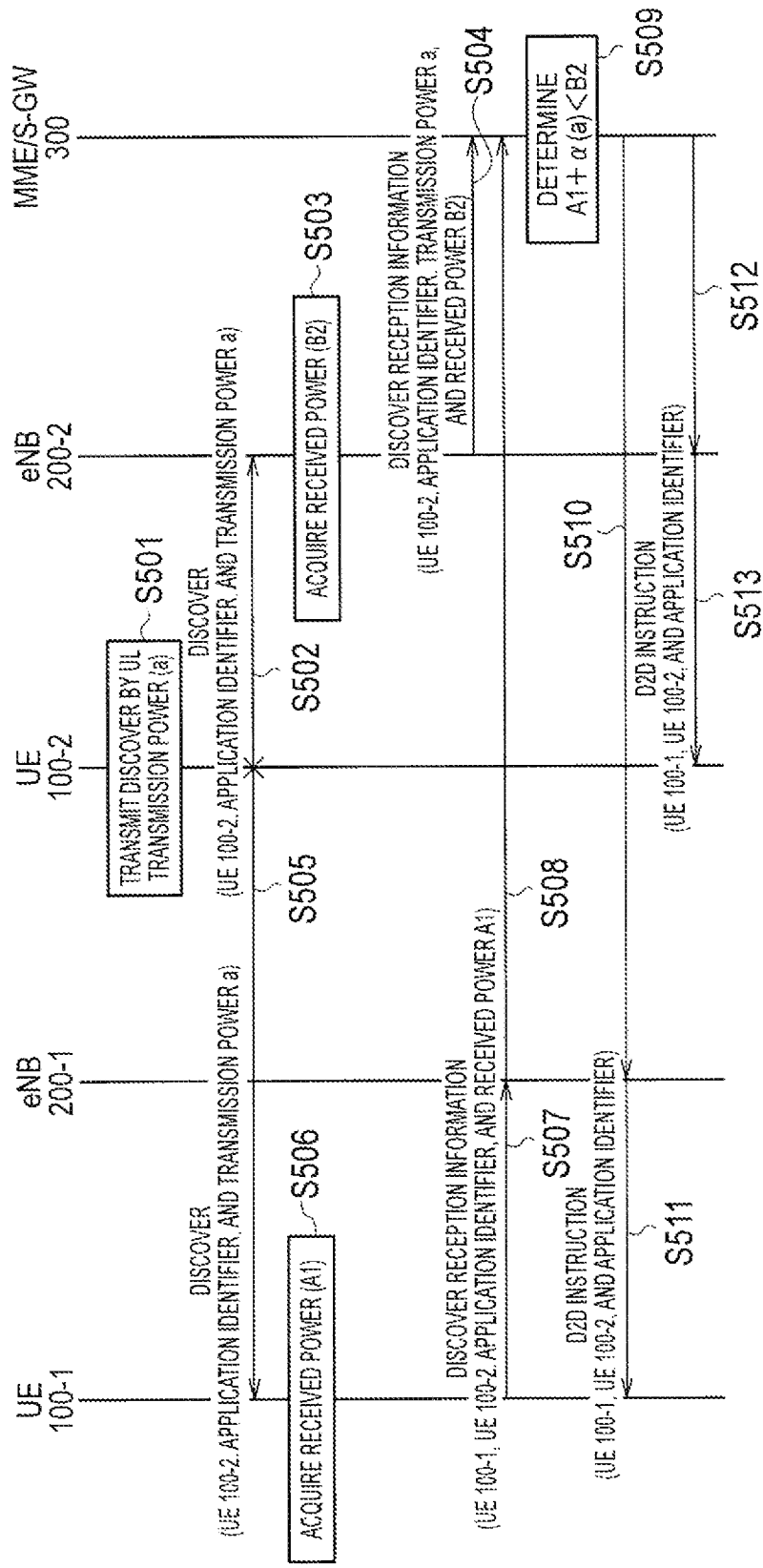
FIG. 13 is a sequence diagram of an operation example 5 according to the embodiment.

FIG. 13 is a sequence diagram of an operation example 5 according to the present embodiment. In this case, differences from the operation example 4 will be mainly described. The present operation example is different from the operation example 4 in that the transmission power value a is not designated from the network.

As illustrated in FIG. 13, in steps S501 and S502, the UE 100-2 transmits the Discover signal by using the transmission power value a. In the present operation example, the Discover signal includes the identifier of the UE 100-2, the identifier of the application that is used in the D2D communication, and the transmission power value a. The eNB 200-2 and the UE 100-1 receive the Discover signal (steps S502 and S505).

In steps S503 and S504, the eNB 200-2 measures the received power value B2 of the Discover signal and transmits the Discover reception information to the MME/S-GW 300. The Discover reception information includes the identifier of the UE 100-2, the identifier of the application that is used in the D2D communication, the transmission power value a, and the received power value B2 of the Discover signal. The MME/S-GW 300 receives the Discover reception information.

Meanwhile, in steps S506 and S507, the UE 100-1 measures the received power value A1 of the Discover signal, and transmits the signal 1 (the Discover reception information in the present operation example) for starting the D2D communication to the eNB 200-1. Furthermore, the UE 100-1 transmits the Discover reception information by using the transmission power value a. The Discover reception information includes the identifier of the UE 100-1, the identifier of the UE 100-2, the identifier of the application used for the D2D communication, and the received power value A1 of the Discover signal. The eNB 200-1 receives the Discover reception information.

In step S508, the eNB 200-1 transfers the Discover reception information to the MME/S-GW 300. The MME/S-GW 300 receives the Discover reception information.

In step S509, on the basis of the Discover reception information, the MME/S-GW 300 determines whether the D2D communication by the UE 100-1 and the UE 100-2 is possible. In the present operation example, when the following condition is satisfied, the MME/S-GW 300 permits the D2D communication by the UE 100-1 and the UE 100-2.

$$A1+\alpha(a)<B1$$

In the above condition, as "α(a)", a value corresponding to the transmission power value a is set.

Meanwhile, when the above conditions are not satisfied, the MME/S-GW 300 rejects the D2D communication by the UE 100-1 and the UE 100-2. The following description will be given on the assumption that the above condition is satisfied.

Subsequent operations (steps S510 to S513) are equal to those (steps S415 to S418) of the operation example 4.

(7) Operation Example 6

Figure 14:
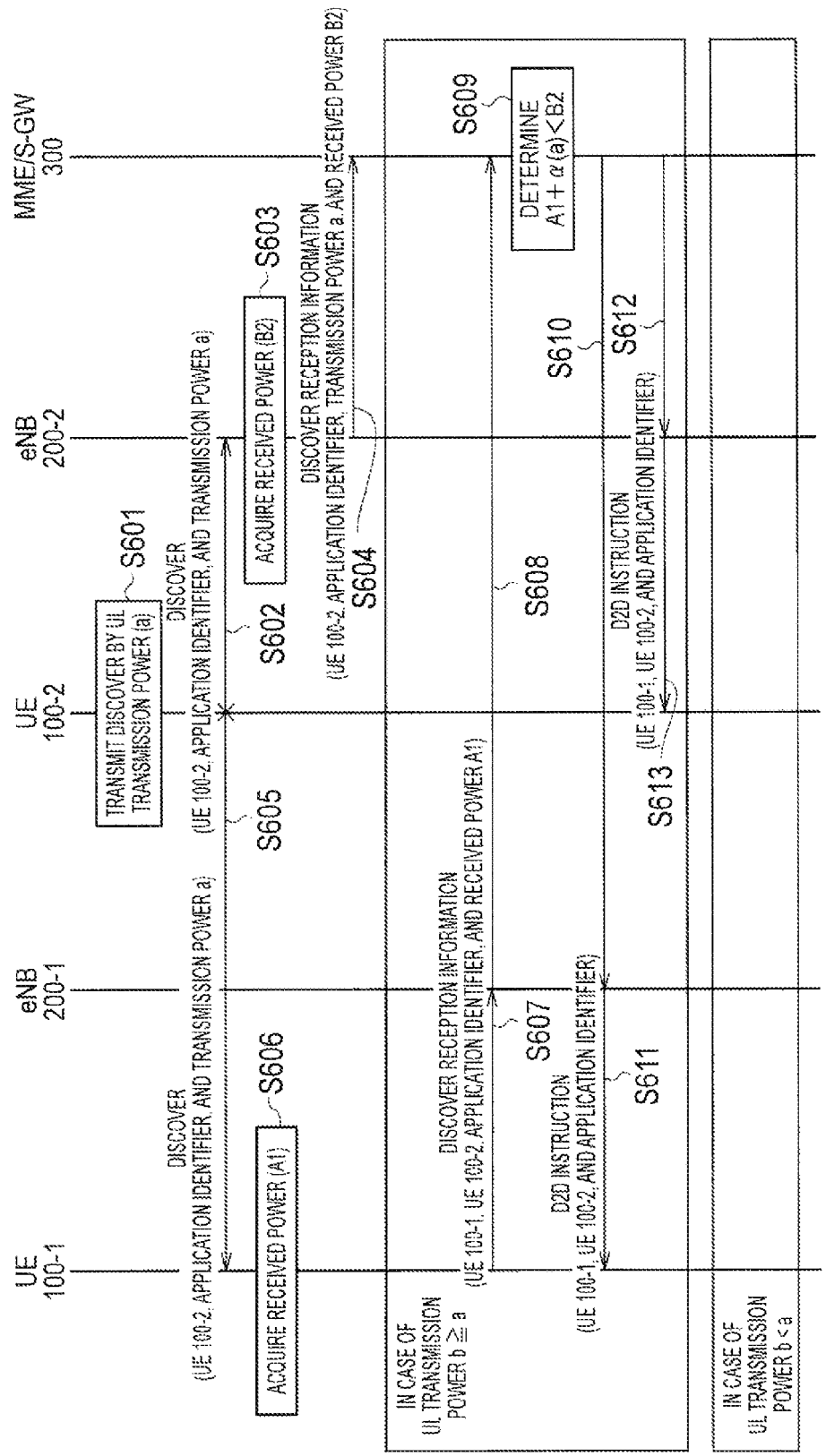
FIG. 14 is a sequence diagram of an operation example 6 according to the embodiment.

FIG. 14 is a sequence diagram of an operation example 6 according to the present embodiment. In this case, differences from the operation example 5 will be mainly described.

As illustrated in FIG. 14, steps (steps S601 to S613) of the present operation example are basically equal to those (steps S501 to S513) of the operation example 5. However, steps S607 to S611 are different from the operation example 5 in that steps S607 to S611 are performed only when a UL transmission power value b is equal to or more than the transmission power value a. That is, when the UL transmission power value b is smaller than the transmission power value a, the UE 100 may not transmit the Discover reception information.

(8) Operation Example 7

Figure 15:
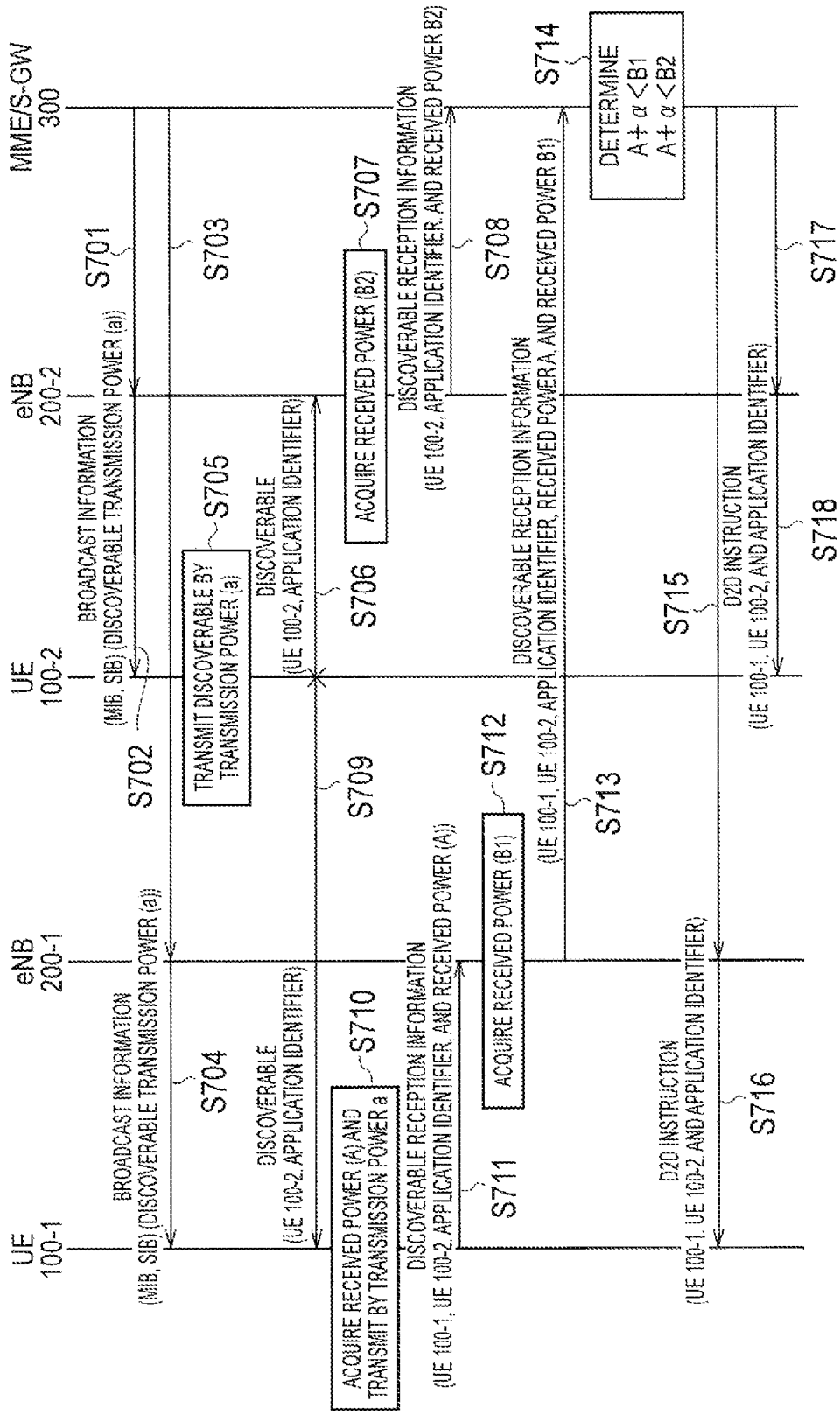
FIG. 15 is a sequence diagram of an operation example 7 according to the embodiment.

FIG. 15 is a sequence diagram of an operation example 7 according to the present embodiment. In this case, differences from the operation example 4 will be mainly described.

As illustrated in FIG. 15, steps (steps S701 to S718) of the present operation example are basically equal to those (steps S401 to S418) of the operation example 4. However, the present operation example is different from the operation example 4 in that the Discoverable signal is used instead of the Discover signal.

(9) Operation Example 8

Figure 16:
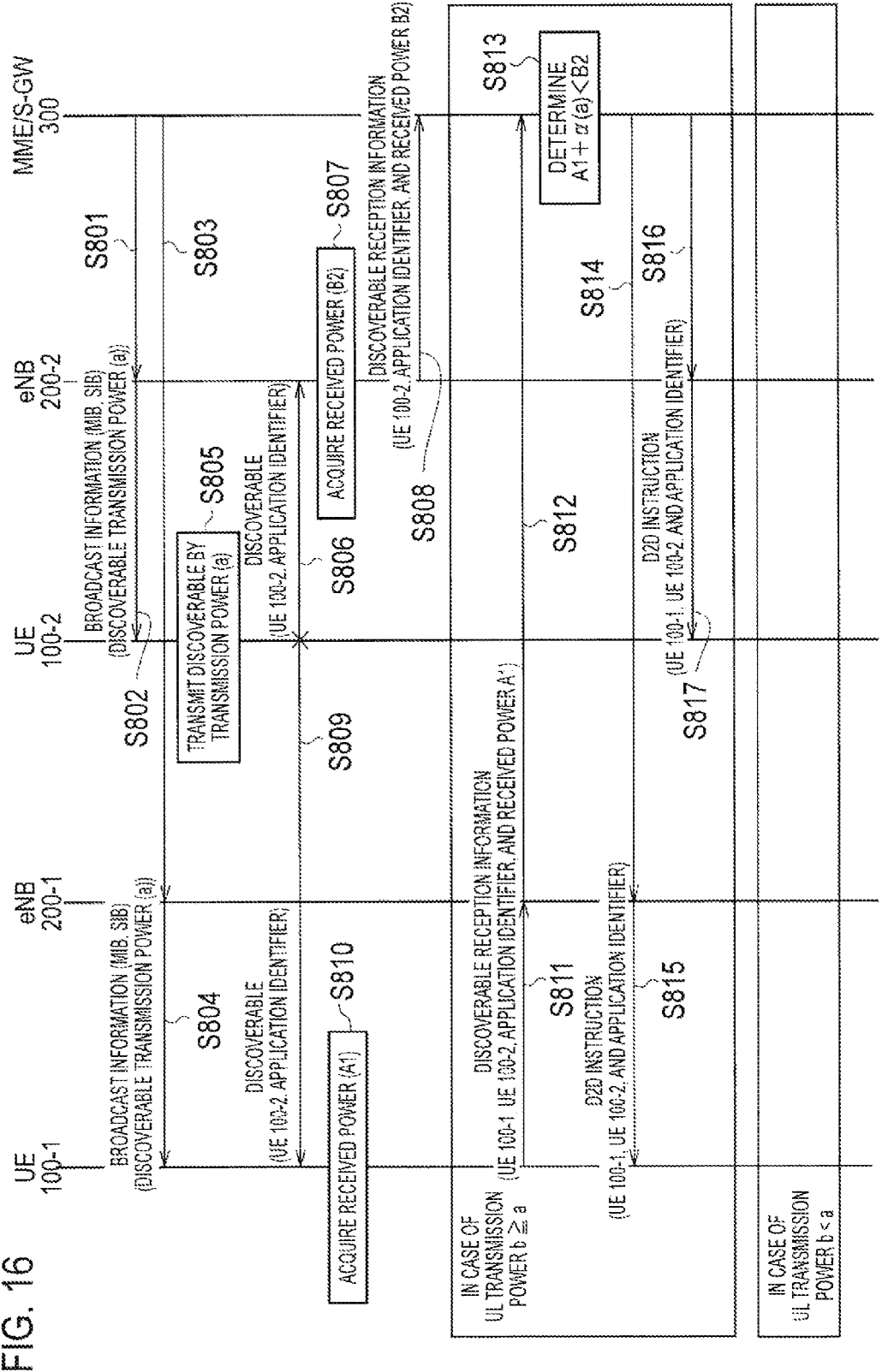
FIG. 16 is a sequence diagram of an operation example 8 according to the embodiment.

FIG. 16 is a sequence diagram of an operation example 8 according to the present embodiment. In this case, differences from the operation example 7 will be mainly described.

As illustrated in FIG. 16, steps S801 to S809 are equal to those (steps S701 to S709) of the operation example 7.

In step S810, the UE 100-1 measures the received power value A1 of the Discoverable signal.

Operations after step S811 are performed only when the UL transmission power value b is equal to or more than the transmission power value a.

In step S811, the UE 100-1 transmits the signal 1 (Discoverable reception information in the present operation example) for starting the D2D communication to the eNB 200-1. Furthermore, the UE 100-1 transmits the Discoverable reception information by using the transmission power value b. The Discoverable reception information includes the identifier of the UE 100-1, the identifier of the UE 100-2, the identifier of the application that is used in the D2D communication, and the received power value A1 of the Discoverable signal. The eNB 200-1 receives the Discoverable reception information.

In step S812, the eNB 200-1 transfers the Discoverable reception information to the MME/S-GW 300. The MME/S-GW 300 receives the Discoverable reception information.

In step S813, on the basis of the Discoverable reception information, the MME/S-GW 300 determines whether the D2D communication by the UE 100-1 and the UE 100-2 is possible. In the present operation example, when the following condition is satisfied, the MME/S-GW 300 permits the D2D communication by the UE 100-1 and the UE 100-2.

$$A1+\alpha(a)<B1$$

In the above condition, as "α(a)", a value corresponding to the transmission power value a is set.

Meanwhile, when the above conditions are not satisfied, the MME/S-GW 300 rejects the D2D communication by the UE 100-1 and the UE 100-2. The following description will be given on the assumption that the above condition is satisfied. Subsequent operations (steps S814 to S817) are equal to the aforementioned operation examples.

(10) Operation Example 9

Figure 17:
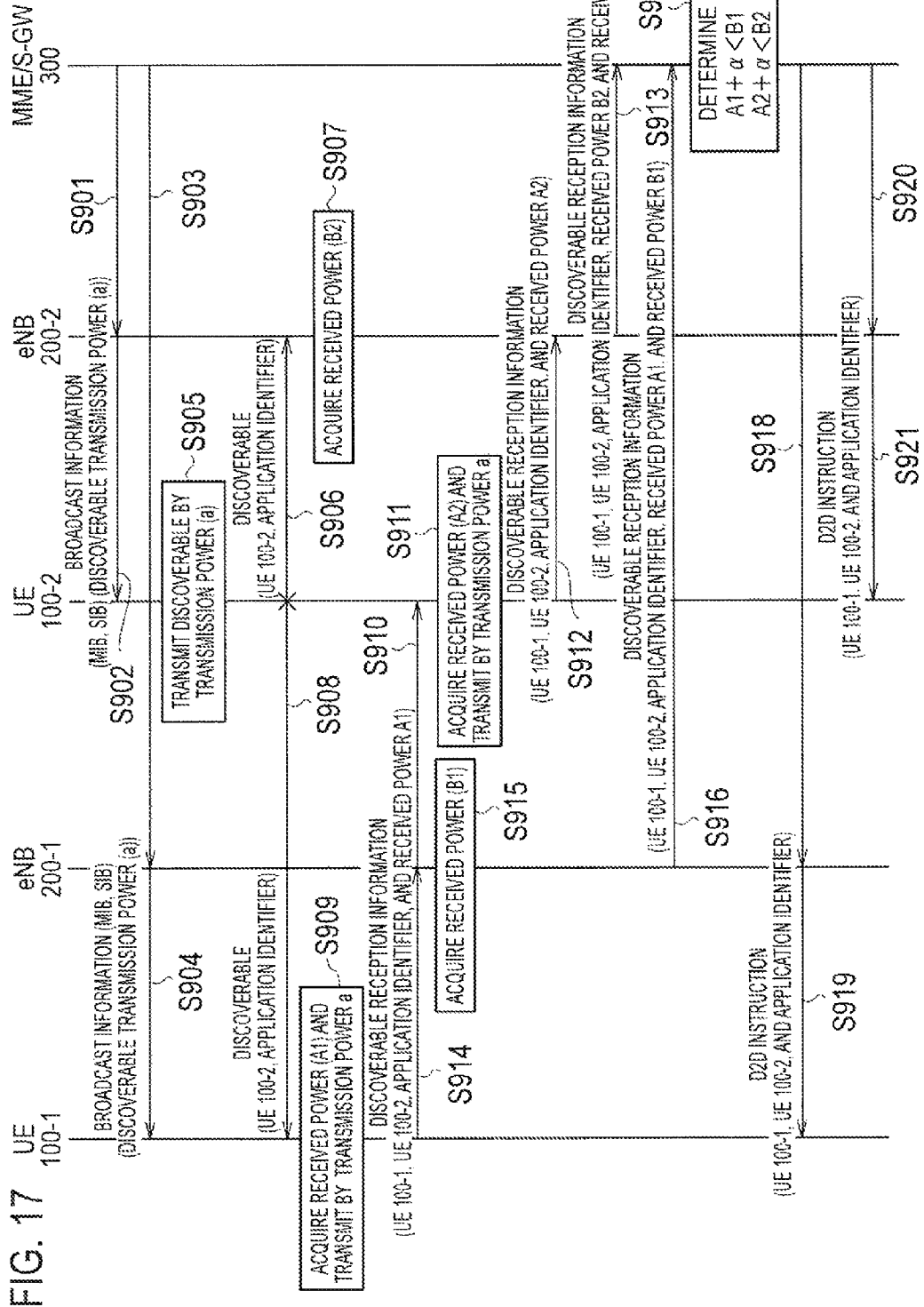
FIG. 17 is a sequence diagram of an operation example 9 according to the embodiment.

FIG. 17 is a sequence diagram of an operation example 9 according to the present embodiment. In this case, differences from the operation example 8 will be mainly described.

As illustrated in FIG. 17, steps S901 to S907 are equal to those (steps S801 to S807) of the operation example 8.

When the Discoverable signal is received from the UE 100-2 in step S908, the UE 100-1 measures the received power value A1 of the Discoverable signal in step S909. Then, in steps S910 and S914, the UE 100-1 transmits the signal 1 (the Discoverable reception information in the present operation example) for starting the D2D communication to the UE 100-2 and the eNB 200-1. Furthermore, the UE 100-1 transmits the Discoverable reception information by using the transmission power value a. The Discoverable reception information includes the identifier of the UE 100-1, the identifier of the UE 100-2, the identifier of the application that is used in the D2D communication, and the received power value A1 of the Discoverable signal.

In step S911, when the Discoverable reception signal is received from the UE 100-1, the UE 100-2 measures the received power value A2 of the Discoverable reception information. Then, in steps S911 and S912, the UE 100-2 transmits the signal 2 (the Discoverable reception information in the present operation example) for starting the D2D communication to the eNB 200-2. Furthermore, the UE 100-2 transmits the Discoverable reception information by using the transmission power value a. The Discoverable reception information includes the identifier of the UE 100-1, the identifier of the UE 100-2, the identifier of the application that is used in the D2D communication, and the received power value A2 of the Discoverable reception signal. The eNB 200-2 receives the Discoverable reception information.

In step S913, the eNB 200-2 adds the received power value B2 to the Discoverable reception information and transfers the Discoverable reception information to the MME/S-GW 300. The MME/S-GW 300 receives the Discoverable reception information.

Meanwhile, in steps S915 and S916, the eNB 200-1 measures the received power value B1 of the Discoverable reception information, adds the measured received power value B1 to the Discoverable reception information, and transfers the Discoverable reception information to the MME/S-GW 300. The MME/S-GW 300 receives the Discoverable reception information.

In step S917, on the basis of the Discoverable reception information, the MME/S-GW 300 determines whether the D2D communication by the UE 100-1 and the UE 100-2 is possible. In the present operation example, when the following condition is satisfied, the MME/S-GW 300 permits the D2D communication by the UE 100-1 and the UE 100-2.

$$A1+\alpha<B1$$

$$A1+\alpha<B2$$

Meanwhile, when the above conditions are not satisfied, the MME/S-GW 300 rejects the D2D communication by the UE 100-1 and the UE 100-2. The following description will be given on the assumption that the above condition is satisfied. Subsequent operations (steps S918 to S921) are equal to the aforementioned operation examples.

(11) Operation Example 10

Figure 18:
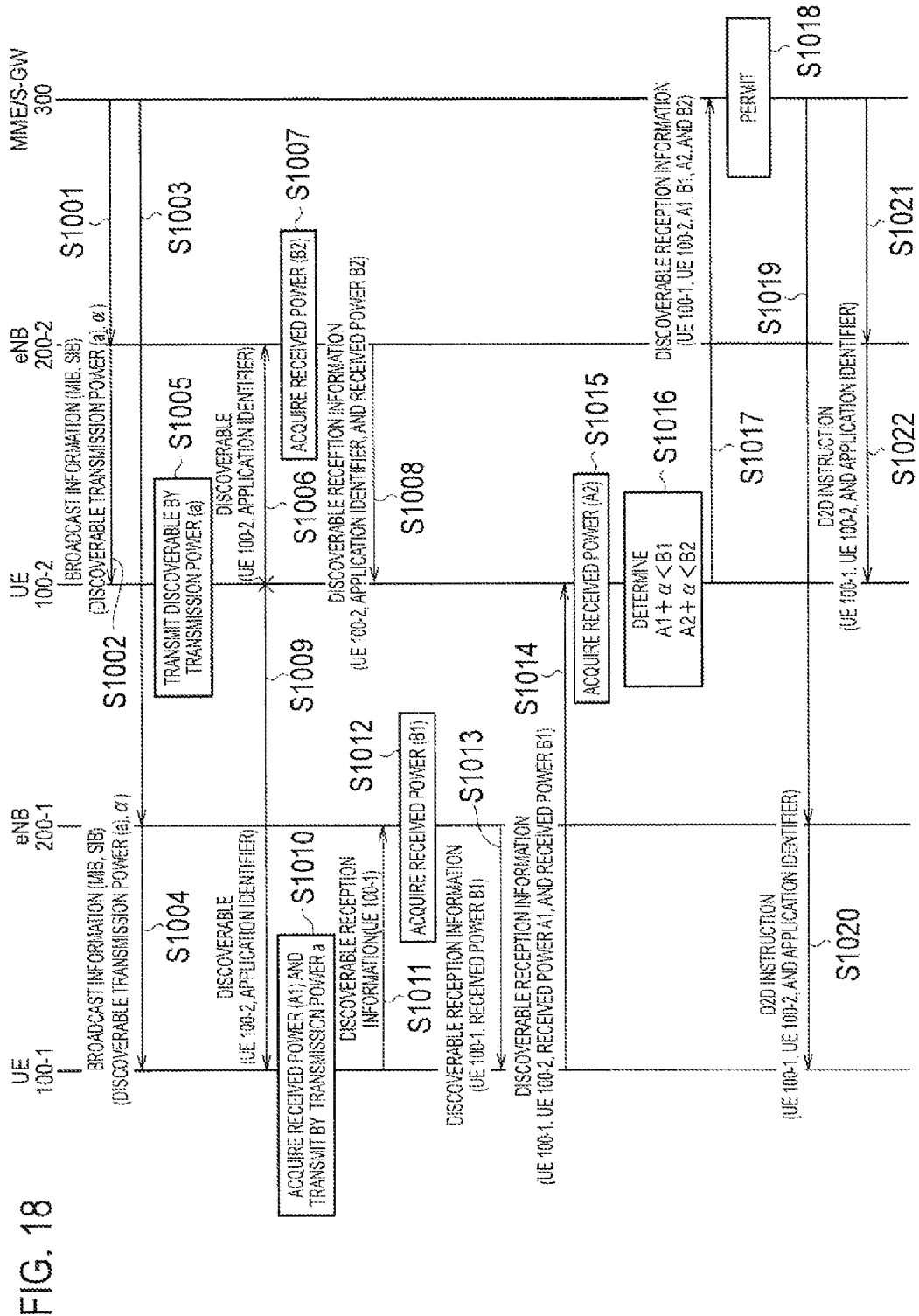
FIG. 18 is a sequence diagram of an operation example 10 according to the embodiment.

FIG. 18 is a sequence diagram of an operation example 10 according to the present embodiment. In this case, differences from the operation example 9 will be mainly described. The present operation example is different from the aforementioned operation examples in that it is the UE 100-2 that determines whether the D2D communication is possible. That is, in the present operation example, the UE 100-2 has a determination unit that determines whether the D2D communication is possible.

As illustrated in FIG. 18, in step S1001, the MME/S-GW 300 notifies the eNB 200-2 of the transmission power value a of the Discoverable signal and "α" (that is, an offset value added to the received power value A).

In step S1002, the eNB 200-2 transmits the transmission power value a and the "α" in a broadcast manner. Specifically, the eNB 200-2 transmits the broadcast information (MIB or SIB) with the transmission power value a and the "α" included therein. The UE 100-2 receives the transmission power value a and the "α".

In step S1003, the MME/S-GW 300 notifies the eNB 200-1 of the transmission power value a of the Discoverable signal and the "α" (that is, the offset value added to the received power value A).

In step S1004, the eNB 200-1 transmits the transmission power value a and the "α" in a broadcast manner. Specifically, the eNB 200-1 transmits the broadcast information (MIB or SIB) with the transmission power value a and the "α" included therein. The UE 100-1 receives the transmission power value a and the "α".

In steps S1005 and S1006, the UE 100-2 transmits the Discoverable signal by using the transmission power value a. In the present operation example, the Discoverable signal includes the identifier of the UE 100-2 and the identifier of the application that is used in the D2D communication. The eNB 200-2 and the UE 100-1 receive the Discoverable signal (steps S1006 and S1009).

In steps S1007 and S1008, the eNB 200-2 measures the received power value B2 of the Discoverable signal and transmits the Discoverable reception information to the UE 100-2. The Discoverable reception information includes the identifier of the UE 100-2, the identifier of the application that is used in the D2D communication, and the received power value B2 of the Discoverable signal. The UE 100-2 receives the Discoverable reception information.

Meanwhile, in steps S1010 and S1011, the UE 100-1 measures the received power value A1 of the Discoverable signal, and transmits the signal 1 (the Discoverable reception information in the present operation example) for starting the D2D communication to the eNB 200-1. Furthermore, the UE 100-1 transmits the Discoverable reception information by using the transmission power value a. The Discoverable reception information includes the identifier of the UE 100-1. The eNB 200-1 receives the Discoverable reception information.

In steps S1012 and S1013, the eNB 200-1 measures the received power value B1 of the Discoverable reception information, adds the measured received power value B1 to the Discoverable reception information, and transmits the Discoverable reception information to the UE 100-1. The UE 100-1 receives the Discoverable reception information.

In step S1014, the UE 100-1 adds the received power value A1 to the Discoverable reception information, and transmits the Discoverable reception information to the UE 100-2.

In step S1015, the UE 100-2 measures the received power value B2 of the Discoverable reception information from the UE 100-1.

In step S1016, on the basis of the Discoverable reception information and the like, the UE 100-2 determines whether the D2D communication by the UE 100-1 and the UE 100-2 is possible. In the present operation example, when the following condition is satisfied, the UE 100-2 determines that the D2D communication by the UE 100-1 and the UE 100-2 is possible.

$$A1+\alpha<B1$$

$$A1+\alpha<B2$$

Meanwhile, when the above condition is not satisfied, the UE 100-2 determines that the D2D communication by the UE 100-1 and the UE 100-2 is not possible. The following description will be given on the assumption that the above condition is satisfied.

In step S1017, the UE 100-2 transmits Discoverable reception information, which indicates that the D2D communication by the UE 100-1 and the UE 100-2 is possible, to the MME/S-GW 300 via the eNB 200-2. The Discoverable reception information includes the identifier of the UE 100-1, the identifier of the UE 100-2, and various power values (A1, B1, A2, and B2). The MME/S-GW 300 receives the Discoverable reception information.

In step S1018, in response to the Discoverable reception information from the UE 100-2, the MME/S-GW 300 permits the D2D communication by the UE 100-1 and the UE 100-2. Subsequent operations (steps S1019 to S1022) are equal to the aforementioned operation examples.

Other Embodiments

It should not be understood that the present invention is limited to the descriptions and drawings constituting a part of this disclosure. From this disclosure, a variety of alternate embodiments, examples, and applicable techniques will become apparent to one skilled in the art.

For example, it may be a network entity other than the MME/S-GW 300 that determines whether or not to permit the D2D communication. For example, whether the D2D communication is possible may be determined by the OAM 400 or the eNB 200.

It is noted that the aforementioned embodiments have not particularly described the radio resource that is used for the transmission of the discovery-use signal (the Discover signal, the Discoverable signal, and the Discover response). However, the radio resource may be treated as follows.

By broadcast information, a resource available as a resource of the discovery-use signal is designated. For example, the resource is designated by a resource block group (RBG), an offset of a subframe, or Cycle periodic ((sFN*10+subframe−offset) % periodic=0). The broadcast information includes two types of resource information. One resource information indicates a radio resource available for the transmission and reception of the discovery-use signal in response to an instruction of the network; and the other resource information indicates a radio resource available for the transmission and reception of the discovery-use signal without the instruction of the network. For example, when N transmission resources exist in one radio frame (SFN), 0 to M−1 are used in response to the network instruction and M to N−1 are not used without the network instruction.

UE 100 that intends to send Discover transmits a band request to the eNB 200. The eNB 200 and the network notify the UE 100 of assignment information including band assignment (Discover Grant) of the Discover, band assignment (Discover Reply Grant) of a Discover response, and a Cell ID that permits a band. On the basis of the transmission band assignment of the Discover, the UE 100 transmits the Discover. At this time, the Discover includes the band assignment (Discover Reply Grant) of the Discover response and the Cell ID that permits a band. When a Serving Cell ID coincides with a Cell ID of the Discover, UE 100 that intends to respond to the Discover transmits a Discover response on the basis of the band assignment (Discover Reply Grant) of the Discover response of the Discover.

When the network instructs the UE 100 to transmit the Discover, the Discover transmission instruction includes transmission band assignment of the Discover, transmission band assignment of the Discover response, and identifiers of all UEs 100 that desire D2D communication. In relation to the transmission band assignment of the Discover and the transmission band assignment of the Discover response, a resource to be used is selected from the transmission band notified by the broadcast information. For example, when N network-designated resources exist in one SFN, a value M from 0 to N−1 is notified as an identifier by the broadcast information. After the notification is received, the UE 100 transmits the Discover by using an Mth resource in one SFN ((SFN*10+subframe−offset)=(M*periodic)).

In the above embodiment, as one example of a mobile communication system, the LTE system is explained. However, the present invention is not limited to the LTE system, and the present invention may be applied to systems other than the LTE system.

In addition, the entire content of U.S. Provisional Application No. 61/694,606 (filed on Aug. 29, 2012) is incorporated in the present specification by reference.

INDUSTRIAL APPLICABILITY

As described above, the present invention is able to appropriately control the D2D communication, and thus is available for a radio communication field such as mobile communication.

The invention claimed is:

1. A mobile communication system that supports D2D communication that is direct device-to-device communication, comprising:
a user terminal that measures a received power value of a discovery-use signal for a discovery process of a communication partner in the D2D communication when the discovery-use signal is received from another user terminal;
a base station that measures a received power value of a predetermined signal when the predetermined signal is received from the user terminal or the other user terminal; and
a determination unit that determines whether to permit the D2D communication performed by the user terminal and the other user terminal on the basis of a comparison of the received power value of the discovery-use signal with the received power value of the predetermined signal.

2. The mobile communication system according to claim 1, wherein the user terminal transmits the predetermined signal including the received power value of the discovery-use signal to the base station.

3. The mobile communication system according to claim 1, wherein the base station receives the discovery-use signal as the predetermined signal.

4. The mobile communication system according to claim 1, wherein the transmission power value of the discovery-use signal and/or the transmission power value of the predetermined signal are designated by the base station.

5. A communication control method in a mobile communication system, which supports D2D communication that is a direct device-to-device communication, comprising:
a step A of measuring, by a user terminal, a received power value of a discovery-use signal for a discovery process of a communication partner in the D2D communication when the discovery-use signal is received from another user terminal;
a step B of measuring, by a base station, a received power value of a predetermined signal when the predetermined signal is received from the user terminal or the other user terminal; and
a step C of determining whether to permit the D2D communication performed by the user terminal and the other user terminal on the basis of a comparison of the received power value of the discovery-use signal with the received power value of the predetermined signal.

* * * * *